United States Patent
Deruelle et al.

(10) Patent No.: US 7,851,023 B2
(45) Date of Patent: Dec. 14, 2010

(54) USE OF A SILICONE FORMULATION FOR THE DURABLE FUNCTIONALISATION OF TEXTILES FOR SPORTS CLOTHING

(75) Inventors: Martial Deruelle, Mornant (FR); Yves Giraud, Ste Foy les Lyon (FR)

(73) Assignee: Rhodia Chimie, Aubervilliers (FR)

( * ) Notice: Subject to any disclaimer, the term of this patent is extended or adjusted under 35 U.S.C. 154(b) by 909 days.

(21) Appl. No.: 10/586,740

(22) PCT Filed: Jan. 21, 2005

(86) PCT No.: PCT/FR2005/000147

§ 371 (c)(1),
(2), (4) Date: Jan. 25, 2007

(87) PCT Pub. No.: WO2005/080666

PCT Pub. Date: Sep. 1, 2005

(65) Prior Publication Data

US 2007/0277326 A1 Dec. 6, 2007

(30) Foreign Application Priority Data

Jan. 21, 2004 (FR) .................................... 04 00548

(51) Int. Cl.
*B05D 3/10* (2006.01)
(52) U.S. Cl. ............................ 427/387; 528/39; 528/17
(58) Field of Classification Search ................... 528/17, 528/39; 427/387
See application file for complete search history.

(56) References Cited

U.S. PATENT DOCUMENTS

| 3,434,875 A | | 3/1969 | Smith et al. | |
|---|---|---|---|---|
| 4,781,973 A | * | 11/1988 | Zotto | 442/81 |
| 5,209,965 A | | 5/1993 | Caldwell | |
| 5,391,680 A | * | 2/1995 | Maruyama | 528/38 |
| 2002/0082377 A1 | * | 6/2002 | Bohin et al. | 528/15 |
| 2004/0219373 A1 | | 11/2004 | Deruelle et al. | |
| 2005/0123689 A1 | | 6/2005 | Branlard et al. | |

FOREIGN PATENT DOCUMENTS

| EP | 0 312 949 A2 | 4/1989 |
|---|---|---|
| EP | 0 506 113 A2 | 9/1992 |
| EP | 0 651 089 A1 | 5/1995 |
| WO | 03/066960 A1 | 8/2003 |
| WO | 2004/074569 A1 | 9/2004 |

* cited by examiner

*Primary Examiner*—Kuo-Liang Peng
(74) *Attorney, Agent, or Firm*—Buchanan Ingersoll & Rooney PC

(57) ABSTRACT

An essential aim of the invention is a treatment which permits: (i) coating a textile material and/or threads, fibers and/or filaments making up the textile material, the silicone formulation cross-linking around the threads, fibers and/or filaments making up the textile material and forming a cross-linked silicone coating around the same and ii) durably imparting water-repellency and impermeability to said textile material without substantially affecting the intrinsic respirability of the textile material. Said aim is achieved by means of the present invention using at least one cross-linkable silicone formulation as a base for the textile coating material, particularly, of a textile material which may be used for the production of sports clothing.

25 Claims, No Drawings

USE OF A SILICONE FORMULATION FOR THE DURABLE FUNCTIONALISATION OF TEXTILES FOR SPORTS CLOTHING

This is the U.S. national phase of International Application No. PCT/FR2005/000147, filed Jan. 21, 2005, claiming priority of Application No. 0400548 filed in France on Jan. 21, 2004, both of which are incorporated by reference herein in their entireties and relied upon.

The area of the present invention is that of crosslinkable liquid silicone formulations capable of being used to form a coating which allows durable functionalities to be imparted to a large number of textile materials, in particular those used in the area of sports clothing ("sportswear").

Numerous treatments are applied to the textile materials, which impart to them additional functionalities such as, in particular, softness, hydrophilicity, hydrophobicity and oleophobicity. Said treatments often consist in the depositing on the textile surface of polymers, mainly of the silicone type. For softness, these are long polydimethylsiloxane oils (or even polyorganosiloxane gums). For hydrophilicity, they are aminated silicone oils or silicone oils with polyether groups. Organosilicic or fluorinated purely organic compounds are incorporated when it is sought to confer oleophobicity.

For certain applications, for example water-proofing of clothing, one of the characteristics sought is the permanency of the treatment. It is observed in practice that the numerous current formulations do not permit satisfactory durabilities to be achieved.

As regards textiles used for sportswear, the main characteristics required are as follows: comfort, respirability, water repellency and a certain degree of impermeability:

Comfort is conferred mainly by the nature and the type of textile used. In addition, these textiles can be endowed with properties of resilience.

Respirability is provided mainly by the structure of the textile, in particular its open porosity. It is to be noted that the use of a waterproof-breathable (rainproof and breathing) membrane reduces to a considerable extent the intrinsic respirability of the textile and no longer permits the release of heat and water in the case of moderate or high to very high activity (which is the case during the practice of a sport).

Water repellancy is a characteristic of the surface of the textile. It corresponds to the fact that under moderate sprinkling (representative of light rain) the water does not stick to the textile, which consequently stays more or less dry.

Impermeability to liquid water is more a "mass-type" characteristic of the textile in the sense that the water has to invade and pass through the porosity of the textile surface. The number and the size of the pores are to be taken into consideration, and also the treatment of the surface of said pores (surface of the woven or knitted fibres). The impermeability is measured by the pressure that has to be applied in order to compel the water to pass through the textile. The word "impermeable" is usually used as soon as the critical water pressure is equivalent to that of a meter of water. In practice, such a protection is useful in only 10% of the situations (very heavy rain, sustained contact with wet surfaces, etc.). It is instructive to bear in mind that a pressure approximately 10 cm of water is equivalent to that exerted by a wind of 140 km/h.

Imparting the whole of said functions to a textile material is already a technical feat in itself. Combining water repellency and impermeability with respirability is in particular notoriously difficult.

Imparting durable functions to the textile material is an additional technical difficulty. It is known (cf. patent DE-A-2 822 393) that, in order to improve the anchorage, it is desirable to provide covalent chemical bonds between the support and the compound which it is desired to deposit on the textile surface. However, given the nature and the diversity of the polymers used to manufacture textile materials, said option is not always possible, and when it is, it remains specific to a certain type of textile support material.

The obtaining of textiles possessing the above-mentioned properties for sportswear in a durable manner, in particular very good respirability combined with strong water repellency and an impermeability corresponding to several tens of centimeters of water, may prove very attractive to the sportswear market. The obtaining of such clothing capable of rapid drying would be an additional plus. Emphasis will also be placed on the fact that for this type of application, the persistence of the properties in conditions of humid abrasion, and more particularly during washing, is paramount.

The aim of the present invention is therefore to supply a treatment that confers durable functionalities on textile materials and in particular functionalities adapted to the field of sportswear.

It has the aim in particular of supplying a treatment for conferring on the textile material in a durable manner very good respirability and/or strong water repellency and/or strong impermeability, preferably an impermeability corresponding to at least 10 cm of water, better still to several tens of centimeters of water.

It has the aim more particularly of supplying a treatment for conferring on the textile material in a durable manner a strong water repellency and a strong impermeability (preferably an impermeability corresponding to at least 10 cm of water, better still to several tens of centimeters of water), without jeopardising in a substantial manner the respirability properties intrinsic to the textile material.

Another aim of the invention is to supply a treatment for conferring additionally on the textile, in a durable manner, capacities for rapid drying and/or a reduced water absorption (moisture regain).

Another aim of the invention is to supply a treatment for conferring on the textile such properties that persist in conditions of humid abrasion and more particularly during washing.

Another aim of the invention is therefore to supply a process for producing textile materials and articles incorporating them, for example clothing having durable waterproof-breathable properties and exhibiting in particular a pronounced resistance to washing and more generally to the constraints of use.

These aims, among others, are achieved by the present invention, which relates to the use of at least one crosslinkable liquid silicone formulation as the base coat of a textile material preferably intended for the production of a sports garment:

in order to provide, by crosslinking around the threads, fibres and/or filaments making up the textile material, a broad cover for protection of the textile material, which protection is not very dependent of the nature of said material by virtue of the fact that it requires few if any anchorage points;

in order to provide, by making a chemically crosslinking silicone sheath, a durable protection of the textile material by conferring on it an excellent resistance to the attacks encountered during use; the expression "durable protection" is taken to mean protection on the one hand against constraints imposed by textile processes, such as, in particular, heat and heat-setting treatments, dyeing treatments, and on the other against the attacks undergone during the life of the textile material (for example, a garment) such as, in particular, abrasion during wear, washings in aqueous detergent medium, dry cleaning in solvent medium;

in order to confer on the textile material, by imparting one or more hydrophobicity functionalities, respirability, water repellency and impermeability (preferably impermeability corresponding to at least 10 cm of water, better still to several tens of centimeters of water), with in addition optionally an advantageous capacity for rapid drying; and in order, by reason of the special nature of the constituents of the formulation, to perform the operations for depositing of the liquid formulation or its constituents, and its crosslinking, at any moment of the processes for manufacture and/or renovation and/or maintenance of the textile material.

The present invention also relates to the use of a crosslinkable liquid silicone formulation comprising one or more hydrophobicity functionalities in order (i) to coat a textile material capable of being used for the production of a sports garment and/or threads, fibres and/or filaments making up said textile material, the silicone formulation crosslinking around the threads, fibres and/or filaments making up the textile material and forming a crosslinked silicone sheath around the same and (ii) durably imparting water repellency and impermeability to said textile material, preferably without substantially affecting the intrinsic respirability of the textile material.

The durability of the treatment and of the above-mentioned properties is paramount. The durability can be evaluated in a context including the washing of the textile material. Tests conducted by the applicant in drastic washing conditions have demonstrated the remarkable effectiveness of the silicone treatment, correlated with a persistence of the properties. Said durability can be measured by comparing the results for the treated textile material before and after said material has undergone an intensive washing protocol, for example that described in Example 4 (continuous washing with water at 50° C., for 8 hours), the material being wrung and dried before undergoing the test protocol or protocols on the properties.

The beading effect (property of water repellence) can be measured by the "Spray test" method, AATC Test Method 22-1996; said method is described in the examples and can consist in a visual evaluation of the wet appearance of the specimen; the test consists in sprinkling the specimen of the textile article with a given volume of water; the appearance of the specimen is then evaluated visually and optionally compared with a standard; a mark from 0 to 100% is awarded as a function of the quantity of water absorbed; for 0%, the specimen is completely wet, for 100% the specimen is completely dry. It is also possible to weigh the specimen in order to measure the quantity of water absorbed. According to the invention, the beading effect corresponds preferably to a mark of at least 80%, in more preferred manner at least 90, better of 100% (80-100% range). By durability of the beading effect is meant that, preferably, after the washing treatment the mark remains between 70 and 100%, preferably between 80 and 100%.

The impermeability to liquid water can be measured by the Schmerber test (ISO Test Method 811-1981), which consists in applying a water pressure to the textile by means of a water column and in measuring the minimum height which it is necessary to achieve in order that the water passes through the textile. According to the invention, the impermeability aimed at is preferably greater than or equal to 10 cm of water column according to this test, and in more preferred manner greater than or equal to 15 cm, better still to 20 cm. By durability of said property of impermeability is meant that, after the washing treatment described, the impermeability is not substantially affected and remains greater than or equal to 10, 15 or 20 cm of water column.

The measurement of the durability of the properties of water repellency and impermeability makes it possible to evaluate the durability of the silicone treatment according to the invention. The other properties conferred by the combination between the textile, its constituent threads, fibres or filaments, and the silicone treatment also profit from said durability.

By "intrinsic" respirability is meant the respirability of the textile material in the absence of treatment. The present invention makes it possible to produce a textile material having the above-mentioned properties of water repellency and impermeability without substantial jeopardising of the intrinsic respirability. By "substantial" is meant that the respirability of the material treated represents at least 90% of the intrinsic respirability. (ASTM standard E 96 B—Diffusion of water vapour)

With advantage also, the treatment makes it possible to limit the absorption of water or moisture gain (weight of water absorbed) of the textile treated and/or to impart to it a capacity for rapid drying, in a durable manner. The water absorption of a textile material and its drying rate can be measured by weighing of a remnant of said textile material before and after dynamic humidification, and the values obtained expressed in per cent by weight compared with the weight of the dry remnant. The low level of water absorption observed makes it possible to limit the "freezing effect", namely the sensation of cold resulting form the heat exchanges in contact with a wet garment. Said properties can be evaluated in the following manner: fabric remnants for testing, weighed beforehand in the dry state, are subjected to a dynamic humidification phase (arranged in a bottle filled with water and subjected to intense stirring for a period of one hour; more precise conditions are given in Example 5), the remnants are then weighed (a comparison of the weights before and after humidification gives an indication of the water absorption), dried on the balance in a conditioned room under temperature of 23° C. and relative humidity of 50%, and the trend in their weight enables their drying capacity to be evaluated. The values observed will depend on the nature of the textile material. It can be stated, however, that the treatment is aimed at limiting the water absorption so that the weight of the remnant of treated textile material remains at least 50%, preferably at least 60 or 70% less than the weight of the non-treated reference remnant.

The uses according to the invention are preferably aimed at providing the textile material in a durable manner with the three properties that are respirability, water repellency and impermeability, preferably combined in addition with a durable low water absorption capacity (thus conferring wearing comfort by limiting the thermal losses due to the evaporation of water) and a durable rapid drying.

In the present memorandum, the expression "textile material" designates on the one hand the threads, fibres and/or filaments of synthetic and/or natural materials that are employed for the manufacture of textile articles, and on the other the textile articles made from said threads, fibres and/or filaments, comprising at least one textile surface and consisting for example in woven, non-woven and/or knitted articles, said "made textile articles" encompassing both fabrics and garments, for example jackets and trousers.

Thus, owing to the use of said formulation, the durable fixing of a functional siloxane network to the textile surface is carried out, and the treatment thus provided makes it possible to obtain successfully the various advantageous properties mentioned above. It has also been observed that in certain cases the treatment thus provided not only in no way prevents the subsequent dyeing of the textile material, but can also create an effect of improvement in the fastness of the colours to washing.

According to a preferred characteristic of the invention, the crosslinkable liquid silicone formulation used as a base coat for textile material comprises:

A—a system for generating a film-forming silicone network containing at least one polyorganosiloxane (POS) resin exhibiting, per molecule, on the one hand at least two different siloxyl units chosen from those of types M, D, T, Q, one of the units being a T unit or a Q unit, and on the other at least three hydrolysable/condensable groups of types OH and/or $OR^1$ where $R^1$ is a $C_1$ to $C_6$, preferably $C_1$ to $C_3$, linear or branched alkyl radical;

B—a system promoting anchorage of said network to the surface of the textile material, consisting of
either B-1 at least one metallic alkoxide with the general formula:

$$M[(OCH_2CH_2)_aOR^2]_n \qquad (I)$$

in which:
M is a metal chosen from the group formed by: Ti, Zr, Ge, Si, Mn and Al;
n=valency of M;
the substituents $R^2$, identical or different, each represent a $C_1$ to $C_{12}$ linear or branched alkyl radical;
a represents 0, 1 or 2;
with the conditions according to which, when the symbol a=0, the alkyl radical $R^2$ possesses from 2 to 12 carbon atoms, and when the symbol a is 1 or 2, the alkyl radical $R^2$ possesses from 1 to 4 carbon atoms;
optionally, the metal M is linked to one or more ligands, for example those obtained by means more particularly of β-diketones, β-ketoesters and malonic esters (for example acetylacetone) or triethanolamine;
or B-2 at least one metallic polyalkoxide resulting from the partial hydrolysis of the monomeric alkoxides of formula (I) mentioned above, in which the symbol $R^2$ has the afore-mentioned meaning with a=0;
or a combination of B-1 and B-2;
or B-3 a combination of B-1 and/or B-2 with:
B-3/1 at least one optionally alkoxylated organosilane containing, per molecule, at least one $C_2$-$C_6$ alkenyl group, and/or B-3/2 at least one organosilicic compound containing at least one epoxy, amino, ureido, isocynato and/or isocyanurate radical;

C—a functional additive consisting of:
either C-1 at least one silane and/or at least one essentially linear POS and/or at least one POS resin, each of said organosilicic compounds being equipped, per molecule, on the one hand with anchorage function(s) (AF) capable of reacting with A and/or B or capable of generating in situ functions capable of reacting with A and/or B and on the other with hydrophobicity function(s) (HF) which can be identical to or different from the AF;
or C-2 at least one hydrocarbon compound containing at least one linear or branched, saturated or unsaturated hydrocarbon group and optionally one or more heteroatom(s) other than Si (for example an oxygen, fluorine or nitrogen atom) and present in the form of a monomeric, oligomeric (linear, cyclic or branched) or polymeric (linear, cyclic or branched) structure, said hydrocarbon compound being equipped, per molecule, on the one hand with anchorage function(s) (AF) capable of reacting with A and/or B or capable of generating in situ functions capable of reacting with A and/or B and on the other with hydrophobicity function(s) (HF) which can be identical to or different from the AF;
or a mixture of C-1 and C-2;

D—optionally a non-reactive additive system consisting of: (i) at least one organic solvent/diluent and/or a non-reactive organosilicic compound; (ii) and/or water in the case of the employment of a liquid silicone formulation as an emulsion or as an aqueous dispersion, and E—optionally at least one auxiliary agent other than D known to the person skilled in the art, which is chosen, when it is needed, as a function of the applications in which the textile materials treated according to the invention are employed; with the condition that is entered into (the parts are given by weight):
for 100 parts of constituent A,
from 0.5 to 200, preferably from 0.5 to 100 and in a more preferred manner from 1 to 70 parts of constituent B,
1 to 1,000, preferably 1 to 300 parts of constituent C,
from 0 to 10,000, preferably from 0 to 5,000 parts of constituent D and
from 0 to 100 parts of constituent E.

The constituents A, usable separately or as a mixture, are conventional film-forming resins, among which there can be mentioned:

A-1: at least one organosilicic resin prepared by co-hydrolysis and co-condensation of chlorosilanes chosen from the group composed of those with the formulas $(R^3)_3SiCl$, $(R^3)_2Si(Cl)_2$, $R^3Si(Cl)_3$, $Si(Cl)_4$. Said resins are branched organopolysiloxane oligomers or polymers that are well known and commercially available. They exhibit, in their structure, at least two different siloxyl units chosen from those of formula $(R^3)_3SiO_{0.5}$ (unit M), $(R^3)_2SiO$ (unit D), $R^3SiO_{1.5}$ (unit T) and $SiO_2$ (unit Q), at least one of said units being a T or Q unit. The $R^3$ radicals are distributed in such a way that the resins contain roughly from 0.8 to 1.8 $R^3$ radicals per atom of silicon. In addition, said resins are not fully condensed and they still possess approximately from 0.001 to 1.5 OH group and/or $OR^1$ alkoxyl per atom of silicon;

the $R^3$ radicals are identical or different and are chosen from $C_1$-$C_6$ linear or branched alkyl radicals, $C_2$-$C_4$ alkenyl radicals, phenyl, trifluoro-3,3,3-propyl. There can be mentioned as alkyl $R^3$ radicals, for example, methyl, ethyl, isopropyl, tertiary-butyl and n-hexyl radicals;

as examples of branched organopolysiloxane oligomers and polymers there can be mentioned the MQ resins, the MDQ resins, the TD resins and the MDT resins, the OH and/or $OR^1$ groups being able to be borne by the M, D and/or T units, the content by weight of OH and/or $OR^1$ groups lying between 0.2 and 10 wt %;

A-2: at least one mixed resin prepared by co-condensation of the organosilicic resins A-1 mentioned above with conventional organic polymers such as: polyester and alkyd resins modified or not by fatty acids such as oleic, linoleic, ricinoleic acid or esters of fatty acids and aliphatic polyols such as castor oil, tallow; epoxy resins modified or not by fatty acids; phenolic, acrylic, melamine-formaldehyde resins; polyamides; polyimides; polyamides-imides; polyureas; polyurethanes; polyethers; polycarbonates; polyphenols.

As specific examples of A constituents which are preferred, mention can be made of the mixtures A-3:

of at least one resin of type A-1 (resin A-1/1) exhibiting, in its structure, at least two different siloxyl units chosen from those of formula $(R^3)_3SiO_{0.5}$ (unit M), $(R^3)_2SiO$ (unit D) and $R^3SiO_{0.5}$ (unit T), at least one of said units being a T unit, the OH and/or $OR^1$ groups being able to be borne by the M, D and/or T units and the content by weight of OH and/or $OR^1$ groups lying between 0.2 and 10 wt %, and of at least one other resin of type A-1 (resin A-1/2) exhibiting in its structure at least two different siloxyl units chosen from those of formula $(R^3)_3SiO_{0.5}$ (unit M), $(R^3)_2SiO$ (unit D) and $R^3SiO_{1.5}$ (unit T) and $SiO_2$ (unit Q), at least one of said units being a Q unit, the OH and/or $OR^1$ groups being able to be borne by the M, D and/or T units and the content by weight of OH and/or $OR^1$ groups lying between 0.2 and 10 wt %.

As specific examples of A constituents that are well suited, there can be mentioned the mixtures A-3:

of at least one hydroxylated MDT resin having a content by weight of OH group of between 0.2 and 10 wt %, and at least one hydroxylated MQ resin having a content by weight of OH group of between 0.2 and 10 wt %.

In the A-3 mixtures, the respective proportions of the constituents are not critical and can vary within wide proportions. Said mixtures contain for example from 60 to 90 wt % of resin(s) A-1/1 and from 40 to 10 wt % of resin(s) A-1/2.

As regards the B-1 constituents, there can be mentioned, as examples of symbols $R^2$ in the organic derivatives of the metal M of formula (I), methyl, ethyl, propyl, isopropyl, butyl, isobutyl, hexyl, ethyl-2-hexyl, octyl, decyl and dodecyl radicals.

As specific examples of B-1 constituents that are preferred, there can be mentioned: alkyl titanates such as ethyl titanate, propyl titanate, isopropyl titanate, butyl titanate, ethyl-2-hexyl titanate, octyl titanate, decyl titanate, dodecyl titanate, β-methoxyethyl titanate, β-ethoxy-ethyl titanate, β-propoxyethyl titanate, titanate with the formula $Ti[(OCH_2CH_2)_2OCH_3]_4$ or mixture of at least two of them; alkyl zirconates such as propyl zirconate, butyl zirconate or mixture of at least two of them; alkyl silicates such as methyl silicate, ethyl silicate, isopropyl silicate, n-propyl silicate or mixture of at least two of them; and mixtures of at least two of said products.

As specific examples of B-2 polyalkoxides that are preferred, produced by the partial hydrolysis of the monomeric titanates, zirconates and silicates, there can be mentioned: B-2 polytitanates produced by partial hydrolysis of the isopropyl, butyl or ethyl-2-hexyl titanates; B-2 polyzirconates produced by partial hydrolysis of the propyl and butyl zirconates; B-2 polysilicates produced by partial hydrolysis of the ethyl and isopropyl silicates; and mixtures of at least two of said products.

As specific examples of B-3/1 constituents that are preferred, mention can be made of optionally alkoxylated organosilanes chosen from products with the following general formula:

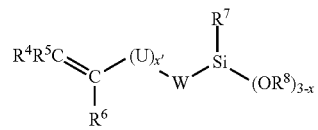

(B-3/1)

in which:

$R^4$, $R^5$, $R^6$ are hydrogenated or hydrocarbon radicals identical or different from one another and represent, preferably, hydrogen, a $C_1$-$C_4$ linear or branched alkyl or a phenyl optionally substituted by at least one $C_1$-$C_3$ alkyl, U is a $C_1$-$C_4$ linear or branched alkylene, or a divalent group with the formula —CO—O-alkylene-, where the alkylene group has the definition given above and the free valency on the right (in bold) is linked to the Si via W, W is a valency bond, $R^7$ and $R^8$ are identical or different radicals and represent a $C_1$-$C_4$ linear or branched alkyl, x'=0 or 1, x=from 0 to 2, preferably 0 or 1 and more preferably still 0.

Without this being limiting, it can be considered that the vinyltrimethoxysilane or the γ-(meth)acryloxypropyltrimethoxysilane is a particularly appropriate B-3/1 compound.

As specific examples of B-3/2 constituents that are preferred, mention can be made of the tris[(trialkoxysilyl)alkyl] isocyanurates, where the alkyl groups contain from 1 to 4 carbon atoms and the organosilicic compounds are chosen:

from the B-3/2a products conforming to the following general formula:

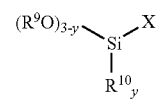

(B-3/2-a)

in which:

+$R^9$ is a $C_1$-$C_4$ linear or branched alkyl radical,

+$R^{10}$ is a linear or branched alkyl radical,

+y is equal to 0, 1, 2 or 3, preferably to 0 or 1, more preferably still to 0,

+where X has the meaning:

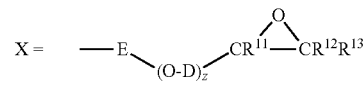

with:

+E and D which are identical or different radicals chosen from the $C_1$-$C_4$ linear or branched alkyls, +z which is equal to 0 or 1, +$R^{11}$, $R^{12}$, $R^{13}$ which are identical or different radicals representing hydrogen or a $C_1$-$C_4$ linear or branched alkyl, hydrogen being more particularly preferred, +$R^{11}$ and $R^{12}$ or $R^{13}$ being able alternatively to constitute, together and with the two carbons bearing the epoxy, an alkyl ring having from 5 to 7 members, or from the B-3/2-b products constituted by epoxy-functional polydiorganosiloxanes comprising:

(i) at least one siloxyl unit with the formula:

$$X_pG_q\text{SiO}_{\frac{4-(p+q)}{2}} \tag{B-3/2-b}$$

in which:
+ X is the radical as defined above for the formula (B-3/2-a),
+ G is a monovalent hydrocarbon group without unfavourable effects on the activity of the catalyst and chosen, preferably, from alkyl groups having from 1 to 8 carbon atoms inclusive, optionally substituted by at least one halogen atom, advantageously from the methyl, ethyl, propyl and 3,3,3-trifluoropropyl groups, and also from the aryl groups, and advantageously from the xylyl and tolyl and phenyl radicals,
+ p=1 or 2,
+ q=0, 1 or 2,
+ p+q=1,2 or 3, and (ii) optionally at least one siloxyl unit with the formula $$G_r\text{SiO}_{\frac{4-r}{2}} \tag{B-3/2-b2}$$

in which G has the same meaning as above and r has a value of between 0 and 3, for example between 1 and 3.

The B-3/2 compounds are preferably B-3/2-a. tris[3-(trimethoxysilyl)propyl] isocyanurates and epoxyalkoxymonosilanes.

As examples of such B-3/2-a compounds, there can be mentioned:
+ 3-glycidoxypropylmethoxysilane (GLYMO)
+ 3,4-epoxycyclohexylethyltrimethoxysilane.

For the realisation of the invention, there are used in more preferred manner as constituent B the following B-1 titanates, zirconates and silicates, considered alone or as a mixture of one another: ethyl titanate, propyl titanate, isopropyl titanate, butyl (n-butyl) titanate, propyl zirconate, butyl zirconate, ethyl silicate, propyl silicate and isopropyl silicate.

When B-1+B-3/1 or B-1+B-3/2 are used, the proportions by weight of B-1 compared with the total B-1+B-3/1 or B-3/2 are in particular from 5 to 100%, preferably from 8 to 80%.

At the quantitative level, when B-1+B-3/1+B-3/2 are used, it can be stated that the proportions by weight between B-1, B-3/1 and B-3/2, expressed in percentages by weight compared with the total of the three, are as follows:

| B-1 | ≧1, preferably between 5 and 25, |
|---|---|
| B-3/1 | ≧10, preferably between 15 and 70, |
| B-3/2 | ≦90, preferably between 70 and 15, | on the understanding that the sum of these proportions of B-1, B-3/1, B-3/2 is equal to 100%.

The C constituent contains functions U enabling it to stick to the silicone sheath and HF functions conferring hydrophobicity properties on the textile material treated.

The C-1 constituents, usable separately or as a mixture, are silanes, essentially linear POS and POS resins bearing in their molecules, attached to silicon atoms, the two functionalities AF and HF.

The AF functions are more precisely condensable/hydrolysable functions corresponding to OH and/or $OR^1$ or functions capable of generating in situ OH and/or $OR^1$ functions.

The HF functions can contain any known hydrophobic group or any combination of known hydrophobic groups. Preferably, said groups are chosen from the following entities: alkyl groups, silicone groups, fluorinated groups and various combinations thereof. Said groups can develop in addition softness properties.

According to a preferred embodiment, said groups are siloxane sequences containing M, D and/or T units, preferably those defined above with respect to the A-1 constituents.

According to another embodiment, said groups are $C_1$ to $C_{50}$ linear or branched alkyl sequences, more particularly from $C_1$ to $C_{30}$.

According to yet another embodiment, said groups are fluorinated groups with the general formula:

$$-Z-(-R^F)_k$$

in which:
+ Z represents a divalent or trivalent linker of a hydrocarbon kind, containing from 1 to 30 carbon atoms, which can be linear or branched, a cyclic or non-cyclic, saturated or unsaturated aliphatic, aromatic or mixed aliphatic/aromatic group, and which can contain one or more oxygenated heteroatoms.
+ k is 1 or 2,
+ $R^F$ represents the group $-C_sF_{2s}-CF_3$, with s equal to or different from zero or the group $C_sF_{2s}H$ with s equal to or greater than 1.

As specific examples of C-1 constituents that are preferred, the organosilicic compounds listed below can be mentioned:
(i) the essentially linear diorganopolysiloxanes containing a hydroxyl group at each chain end, with the formula:

in which:
+ the substituents $R^{18}$, identical or different, each represent a $C_1$ to $C_{13}$ saturated or unsaturated monovalent hydrocarbon radical, substituted or non-substituted, aliphatic, cyclic or aromatic;
+ j has a value sufficient to confer on the diorganopolysiloxanes of formula (III) a dynamic viscosity at 25° C. ranging from 50 to 10,000,000 mPa·s;
+ it must be understood that, in the context of the present invention, it is possible to use as hydroxylated POS of formula (III) a mixture composed of a plurality of hydroxylated polymers which differ from one another by the value of the viscosity and/or the nature of the substituents bonded to the silicon atoms; it must be understood also that the POS of formula (III) can optionally contain T units of formula $R^{18}\text{SiO}_{3/2}$ and/or $\text{SiO}_2$ units in the proportion of not more than 1% (said percentage expressing the number of T and/or Q units per 100 silicon atoms);
(ii) the hydroxylated POS resins contain in their structure siloxyl units T and optionally M and/or optionally D as defined above with respect to the A-1 resins;

(iii) the hydroxylated POS resins obtained more particularly:

→ by hydrolysis of an alkoxysilane S substituted by HFs; an HF-substituted trialkoxysilane may be involved, for example, which enables a hydroxylated resin with T units, also called T(OH) resin, to be obtained;
→ by homocondensation of the hydrolysed S silanes;
→ and by "stripping" steaming (entrainment with steam) of the hydrolysates derived from the HFs;

(iv) mixtures of at least two of the above-mentioned organosilicic compounds.

As specific examples of C-1 constituents that are well suited, there can be mentioned the hydroxylated MDT resins having a content by weight of OH groups of between 0.2 and 10 wt %, considered alone or in a mixture with hydroxylated silicone oils of formula (III).

As regards the proportions of use of the C-1 constituents, they lie, as explained above, in the range from 1 to 1000 parts by weight of C-1 constituent, according to the HF sought, per 100 parts by weight of constituent A. For example, in cases where the HF confers hydrophobia, in general from 2 to 30 parts by weight of constituent C-1 are then used.

It follows from the definitions given above that in cases where the A constituent is a POS resin equipped with T unit(s) and optionally M and/or optionally D units it should be understood that said resin can then also play the role of functional water-proofing additive C-1, provided that it is utilised in sufficient proportions equal to the sum of the proportions corresponding to the entity A+C-1.

The C-2 constituents, usable separately or in a mixture, are hydrocarbon compounds bearing in their molecule, attached to carbon atoms, the two functionalities AF and HF.

The AF functions are more precisely condensable/hydrolysable functions corresponding to OH and/or $OR^1$ or functions capable of generating in situ OH and/or $OR^1$ functions.

As specific examples of C-2 constituents that are preferred, there can be mentioned fluorinated alcohols, preferably perfluorinated alcohols, of formula:

$$R^{19}—OH \quad (IV)$$

where $R^{19}$ represents an aliphatic, linear or branched radical having from 2 to 20 carbon atoms, said carbon atoms being substituted by at least one fluorine atom and optionally by at least one hydrogen atom.

As specific examples of C-2 constituents that are well suited, there can be mentioned perfluorinated alcohols of formula $R^F—(CH_2)_m—OH$ where $R^F$ is as defined above and m is a number from 0 to 10.

As regards the proportions of use of the C-2 constituents, they lie, as explained above, in the range from 1 to 1,000 parts by weight of C-2 constituent, per 100 parts by weight of constituent A.

As specific examples of optional D constituents that are preferred, there can be mentioned, in addition to water, the compounds listed below:

the conventional organic solvents, some of which are able to act as diluents, chosen from the group composed of:
+aliphatic solvents having from 5 to 20 carbon atoms such as hexane, heptane, "white spirit", octane, dodecane, and cycloaliphatic solvents such as cyclohexane, methylcyclohexane, decalin;
+chlorinated solvents such as trichloroethylene, trichloroethane, perchloroethylene, perchloroethane, dichloromethane;
+aromatic solvents such as toluene, xylene;
+alcohols such as ethanol, isopropanol, butanol, octanol;
+aliphatic ketones such as acetone, methylethyl ketone, methylbutyl ketone and cycloaliphatic ketones such as cyclopentanone, cyclohexanone;
+esters of non-fatty carboxylic acids and alkanols such as ethyl acetate, butyl acetate, pentyl acetate;
+esters derived from $C_{10}$ to $C_{16}$, preferably $C_{12}$ to $C_{14}$ saturated fatty acids, and alkanols such as myristates ($C_{14}$), laureates ($C_{12}$) and mixtures;
+ethers-oxides such as dibutyl ether, diisopropyl ether, ethylene glycol methyl or ethyl monoether, diethylene glycol ethyl or butyl monoether;
non-reactive linear diorganopolysiloxanes of formula:

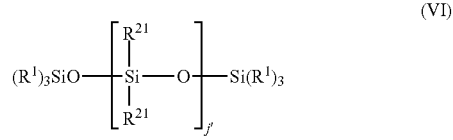

in which
+the substituents $R^{21}$, identical or different, have the same meanings as those given above for the reactive diorganopolysiloxane of formula (III);
+j' has a value sufficient to confer on the polymers of formula (VI) a dynamic viscosity at 25° C. of from 10 to 200,000 mPa·s;
POS resins having the same meanings as those given above for the A constituent, but are this time without any functional group of the OH and/or $OR^1$ type. As specific examples of usable resins, the MQ, MDQ, TD and MDT resins can be mentioned.

As specific examples of optional auxiliary E constituents that are preferred, the compounds listed below can be mentioned:

polycondensation catalysts which are compounds of a metal generally chosen from tin, titanium and zirconium; it is thus possible to use monocarboxylates and dicarboxylates of tin such as tin ethyl-2 hexanoate, dibutyltin dilaurate, dibutyltin diacetate, hexacoordinated tin chelates of valency IV, etc., such as those described in EP-A-0 367 696;
appropriate fillers among which there will be mentioned in particular:
+metal powders such as zinc, aluminium, magnesium powder;
+oxides such as silica, crushed quartz, alumina, zirconium, titanium, zinc or magnesium oxide, oxides of iron, cerium, lanthanum, praseodymia, neodymia;
+silicates such as mica, talcum, vermiculite, kaolin, feldspar, zeolites;
+calcium carbonate, barium metaborate, pyrophosphates of iron, zinc, calcium, zinc phosphate, carbon black;
+pigments such as phthalocyanines, chromium oxides, cadmiun sulphide and cadmium sulphoselenides
+organic or polymeric particles, crosslinked or not;
fungicides, bactericides known to the person skilled in the art;
thixotropic agents known to the person skilled in the art;

and, in the event of the use of a liquid silicone formulation crosslinkable in emulsion or aqueous dispersion, non-ionic, ionic or amphoteric surface-active agents.

The fillers can confer properties of hydrophobia and contribute to further improving the properties of water repellency and impermeability.

The liquid silicone formulations used as textile coating bases, in the context of the present invention, are prepared by the simple mixing at ambient temperature, and in any order of introduction, of the A, B, C, D (optional) and E (optional) constituents. The quantities utilised are clearly defined as indicated above.

Although the constituents can be introduced in any order, it is nevertheless preferable, in order to avoid any risk of precipitation of solid products or gel formation, to add the A constituent in the form of a solution in the D constituent solvent/diluent or in the form of an emulsion/aqueous dispersion when the D constituent contains water.

The introduction and the intimate mixing of the optional fillers E, when they are used, with the A, B, C and optionally D constituents are performed by means of the conventional processes in use by the manufacturers of textile formulations. Pebble mills or turbine mills, for example, can be used for the mixing.

The textile coating base formulations prepared in this way have the advantage of hardening by simple drying in air for a period of time that can range from several tens of minutes to several hours, or several tens of hours if necessary. Said time can be shortened by heating to a temperature lying in the range of 50 to 180° C.

The textile coating bases prepared in this way have an excellent stability during storage and can be employed in all textile applications requiring the presence, after hardening, of durable coatings with very high physical characteristics.

According to an advantageous characteristic, the crosslinkable liquid silicone formulations used as a coating base for textiles can be prepared in concentrated form (for example, from 0 to 100 parts by weight of the D constituent are used per 100 parts by weight of the A constituent), and then be diluted at the moment of their use with an organic diluent, an organic solvent or water at the rate of 1 to 30 parts by weight of formulation per 100 parts by weight of solvent, diluent or water.

According to a first general method of treatment, the use in accordance with the present invention can be initiated directly on textile articles made from threads, fibres and/or filaments, comprising at least one textile surface and consisting for example in woven, non-woven and/or knitted articles, by intervening at any moment of the processes for production (as regards fabrics) and/or renovation and/or maintenance (as regards garments) of the textile material.

By textile surface is meant a surface obtained by the assembling of threads, fibres and/or filaments by any process, such as, for example, sticking, felting, weaving, braiding, flocking or knitting.

The threads, fibres and/or filaments used for the manufacture of said textile articles can be obtained by the processing of a synthetic thermoplastic matrix composed of at least one thermoplastic polymer chosen from the group composed of polyamides, polyolefins, polyvinylidene chlorides, polyesters, polyurethanes, acrylonitriles, (meth)acrylate-butadiene-styrene copolymers, copolymers and mixtures thereof. The thermoplastic matrix can contain additives such as pigments, delustrants, matifying agents, catalysts, heat and/or light stabilisers, anti-bacterial agents, fungicides and/or acaricides. A matifying agent, for example, can be involved, chosen for example from particles of titanium dioxide and/or zinc sulphide.

The threads, fibres and/or filaments can also be obtained from natural materials such as in particular cotton, flax, wool, according to the processing techniques known to the person skilled in the art. Mixtures of synthetic and natural materials can naturally be used.

In the use according to the present invention for applying the textile coating base to the article to be treated, conventional techniques of the textile industry are used, recourse being had in particular to the impregnation technique known as "padding".

When the textile article is treated with a formulation containing a diluent or an organic solvent, it is desirable to remove the diluent or solvent afterwards, for example by subjecting said article to a thermal treatment in order to expel the diluent or solvent in the form of vapour.

In general the quantity of textile base coating deposited on the textile article corresponds to a quantity of between 0.1 and 10 wt % compared with the dry weight of the textile article treated.

According to a second general method of treatment, the threads, fibres and/or filaments can also be placed in contact with the textile base coating at any moment of the processes for producing the textile material.

By thread is meant, for example, a continuous multi-filament object, a continuous thread obtained by the joining of a plurality of threads or a continuous spun yarn of fibres obtained from a single type of fibre, or from a mixture of fibres. By fibre is meant, for example, a short or long fibre, a fibre intended to be worked by spinning or for the making of non-woven articles or a cable intended to be cut in order to form short fibres.

The process for manufacturing threads, fibres and/or filaments generally starts by the passing of the thermoplastic matrix into the die and ends before the textile surface manufacturing stage.

The process for manufacturing threads, fibres and/or filaments comprises more particularly a spinning stage. By spinning stage is meant a specific operation consisting in the obtaining of threads, fibres and/or filaments. The spinning stage starts at the passing of the thermoplastic matrix through one or more dies and ends by the transfer of the threads, fibres and/or filaments obtained onto a spool (for the threads or filaments) or into a pot (for the fibres), also called winding-on. The spinning stage can also comprise stages that are carried out between the passing into the die and the spooling. Said stages can be, for example, stages for sizing, for re-uniting of the filaments (by one or more drive or convergence guide points), for drawing, for re-heating of the filaments, for shrink-proof finishing and for heat setting.

Thus, the depositing on the threads, fibres and/or filaments of the textile base coating in accordance with the present invention can be performed for example after the convergence of the threads, fibres and/or filaments and/or during a stage for drawing of the threads, fibres and/or filaments. Said depositing can also be carried out between said two stages. Preferably, the textile base coating according to the present invention is deposited on the threads, fibres and/or filaments during the sizing stage.

According to another preferred subject of the invention, there is deposited on the threads, fibres and/or filaments an sizing composition containing at least one textile base coating according to the present invention.

It is also possible to deposit the textile base coating according to the present invention on the threads, fibres and/or filaments during a treatment stage on the taking up of the threads, fibres and/or filaments. By treatment stage is meant treatment stages after the taking up of the threads, fibres and/or filaments, such as for example stages of texturing, drawing, drawing-texturing, sizing, shrink-proof finishing, thermo-fixing, twisting, fixing, crimping, washing and/or dyeing. It is possible more particularly to deposit on the threads, fibres and/or filaments a textile base coating according to the present invention during an operation chosen from the group composed of shrink-proof finishing, twisting, fixing, crimping, drawing and/or texturing of the threads, fibres and/or filaments.

It is also possible to carry out the depositing on the threads, fibres and/or filaments of a sizing composition containing at least one textile base coating according to the present invention, in particular during a treatment stage on the taking up of the threads, fibres and/or filaments.

The threads, fibres and/or filaments can also be placed in a washing and/or dyeing composition containing at least one textile base coating in accordance with the present invention.

According to a third general method of treatment, the use according to the present invention can be performed in two stages:

in an initial stage: by placing the threads, fibres and/or filaments in contact with the textile base coating at any moment of the processes for production of the textile material; then in a second stage: by placing in contact the textile articles made from the treated threads, fibres and/or filaments, by intervening at any moment of the processes of production (as regards fabrics) and/or of renovation and/or maintenance (as regards garments) of the textile material.

The treatment with the textile base coating can be applied either in a partial manner or in a complete manner, on the one hand to the threads, fibres and/or filaments, then on the other to the textile articles made from the treated threads, fibres and/or filaments.

By the expression "in a partial manner" it is intended to define in particular an application that consists in treating threads, fibres and/or filaments with a part of the ingredients constituting the textile base coating and in adding the remainder during the treatment of the textile articles made from the treated threads, fibres and/or filaments. For example, the anchorage promoting system (constituent B) can be added at the moment of the treatment of the threads, fibres and/or filaments, while the network generating system (constituent A) and the functional additive (constituent C) are added at the moment of the treatment of the articles.

By the expression "in a complete manner" it is intended to define an application where on the one hand the threads, fibres and/or filaments, then on the other the textile articles made from these threads, fibres and/or filaments are treated, on each occasion, with a textile base coating containing all its constituent ingredients, with the possibility that said ingredients are not necessarily present in the same proportions at the moment of the treatment of the threads, fibres and/or filaments and then at the moment of the treatment of the articles.

It will be stated also that it is possible to carry out one or more deposits of the textile base coating (considered as a whole or in part) on the threads, fibres and/or filaments and/or on the textile articles.

The examples that follow illustrate the use, according to the present invention, of a crosslinkable liquid silicone formulation as a textile base coating.

EXAMPLE 1

Durable Hydrophobicity

1) Crosslinkable Liquid Silicone Formulation According to the Invention (Composition C1):

It possesses the following constitution (the parts are given by weight):

A: mixture of:
hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)_3SiO_{1/2}$ units: 47 parts; and of
hydroxylated MQ resin having 2 wt % of OH and composed of 45 wt % of $SiO_{4/2}$ units and 55 wt % of $(CH_3)_3SiO_{1/2}$ units: 7 parts;

B: mixture of
n-butyl titanate (Bu) of formula $Ti(OBu)_4$: 2 parts; and of
ethyl silicate (Et) of formula $Si(OEt)_4$: 4 parts;

C: hydroxylated MDT resin having 0.5 wt % of OH and composed of 62 wt % of $CH_3SiO_{3/2}$ units, 24 wt % of $(CH_3)_2SiO_{2/2}$ and 14 wt % of $(CH_3)_3SiO_{1/2}$: 10 parts;

D: White spirit: 30 parts.

The compound is re-diluted in some solvent prior to application:

2) Comparison Formulation (Composition C2):

The results for the composition C1 are compared with those for a conventional composition C2 ("Scotch Guard"), which is a commercial product known for its excellent water-proofing properties. It is applied by spray according to the protocol recommended by the supplier.

3) Tests for Permanent Water-proofing:

The treated textile article used is a Polyamide 6.6 tricot of the interlock knitted fabric type produced on circular, double bed knitting machine with PA6.6 threads textured 78 dtex 68 strands and 78 dtex 23 strands.

The textile article is treated by padding with 5 wt % and 10 wt % solutions of composition C1 in heptane. It undergoes a drying at ambient temperature (23° C.) for 12 hours, then is optionally treated thermally for 3 minutes at 150° C.

Measurement of the beading effect is carried out by the standardised water repellency test known under the name of "Spray Test" (AATC Test Method 22-1996)):

The test consists in sprinkling the specimen of the textile article with a given volume of water. The appearance of the specimen is then evaluated visually and compared with the standards. A mark from 0 to 100% is awarded as a function of the quantity of water retained. For 0, the specimen is totally wet, for 100%, the specimen is completely dry.

In order to obtain a more quantitative measurement of the durability aspect of the water repellency effect, the specimens are also weighed before and after sprinkling and the quantity of water retained by the textile article is determined by the difference. Said quantity is then related to the quantity of water retained initially by the non-washed textile specimen.

In order to test the durability of the treatment, a GIRO-WASH test machine (usually employed in the context of studies on colour stability during washing and described in ISO standard 105 C06) was used. This system comprises a mechanical device permitting: the rotation at 40 rpm of a wheel mounted on a horizontal axle and at least one half of which is immersed in a bath heated to the desired temperature (in the present case 50° C.); the fixing to said wheel of sealed containers of stainless steel each with a capacity of 550 ml, a diameter of 75 mm and a height of 125 mm, the bottom of the containers being at 45 mm from the axis of the shaft. Said containers are fixed so as to be perpendicular to the axis of the rotor; the textile specimens are arranged in said small containers in the presence of water, calibrated steel balls 6 mm in diameter are added in order to increase the turbulence and the abrasion during washing. At the end of a given stirring time, the specimens are removed, dried (12 hours at ambient temperature 23° C.) and the beading effect is measured by the test described above. The same specimens are then replaced in the GIROWASH test machine in order to continue the test.

Test results:

The results show clearly that the textile article treated with the composition C1 according to the invention retains its water-proofing properties over time, while the conventional treatment by composition C2 according to the prior art sees its performance decline significantly during the washings.

Ratio (Quantity retained on the textile specimen after X hours of washing/Quantity retained prior to washing)

| Composition | Amount in the solution | Thermal treatment | 0 h | 4 h | 8 h | 11 h | 15 h | 38 h |
|---|---|---|---|---|---|---|---|---|
| C1 | 5% | — | 1 | 0.83 | 0.98 | 0.63 | 0.76 | 0.43 |
| C1 | 5% | 3 min - 150° C. | 1 | 0.94 | 1.24 | 1.53 | 1.12 | 0.56 |
| C1 | 10% | — | 1 | 1.90 | 1.28 | 1.21 | 1.34 | 1.14 |
| C1 | 10% | 3 min - 150° C. | 1 | 1.3 | 1.6 | — | 1.35 | 0.40 |
| C2 | Spray | — | 1 | 0.83 | 1.22 | 1.13 | 2.21 | 3.22 |
| C2 | Spray | 3 min - 150° C. | 1 | 3.53 | 4.47 | 2.84 | 5.16 | 3.84 |

Mark awarded in the Spray Test (%)

| Composition | Amount in the solution | Thermal treatment | 0 h | 4 h | 8 h | 11 h | 15 h | 38 h |
|---|---|---|---|---|---|---|---|---|
| C1 | 5% | — | 80 | 80 | 80 | 80 | 80 | 88 |
| C1 | 5% | 3 min - 150° C. | 90 | 80 | 85 | 80 | 80 | 85 |
| C1 | 10% | — | 80 | 80 | 80 | 80 | 80 | 85 |
| C1 | 10% | 3 min - 150° C. | 95 | 80 | 82 | 80 | 80 | 95 |
| C2 | Spray | — | 98 | 90 | 85 | 88 | 80 | 72 |
| C2 | Spray | 3 min - 150° C. | 92 | 85 | 82 | 80 | 75 | 70 |

EXAMPLE 2

Durable Hydrophobicity with Dyeing

The same composition C1, which is diluted to 14% (by weight) in heptane, is taken as the starting point.

The textile used is a Polyamide 6.6 tricot of the stitched tricot type produced on single bed circular knitting machine with a PA6.6 140 thread dtex 102 strands plaited every other fall.

In this example a test of resistance to dyeing is carried out. The treatment protocol is as follows: impregnation, centri- fuging, drying at ambient temperature (23° C.), then thermal treatment at 150° C. for 10 minutes.

Test Results:

A specimen of the textile article treated by the composition C1 was dyed in a Mathis Labomat laboratory dyeing machine. The bath ratio was 1/50 and the following auxiliary products were used: sodium acetate 0.5 g/l; Sandogene CN 1%; Sandogene NH 1%. The dye Bleu Nylosan N5GL was used in a dose of 1.2%. The rise in temperature of the bath was performed at a rate of 1.5° C./min and the maximum temperature reached was 98° C. The total dyeing time was 45 minutes.

The specimen emerges from the bath entirely dyed: it has retained its water repellency properties for the most part (since its mark in the Spray Test dropped from 90 to 80%).

The specimen is then subjected to a series of machine washings at 50° C. for a total period of 8 hours. At the end of this period, it retains water repellency properties with an 80% mark in the Spray Test.

EXAMPLE 3

Durable Hydrophobicity—Performance with Washing in Industrial Machine

1) Crosslinkable Liquid Silicone Formulation According to the Invention (Composition C3):

It possesses the following constitution (the parts are given by weight):

A: mixture of:
hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)_3SiO_{1/2}$ units: 47 parts; and of
hydroxylated MQ resin having 2 wt % of OH and composed of 45 wt % of $SiO_{4/2}$ units and 55 wt % of $(CH_3)_3SiO_{1/2}$ units: 7 parts;

B: mixture of
tris(3-(trimethoxysilyl)propyl)isocyanurate: 7 parts
n-propyl (Pr) zirconate of formula $Zr(OPr)_4$: 20 parts
n-butyl (Bu) titanate of formula $Ti(OBu)_4$: 2 parts; and of
ethyl (Et) silicate of formula $Si(OEt)_4$: 4 parts;

C-1: mixture of:
hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)_3SiO_{1/2}$ units: 10 parts; and of
hydroxylated linear silicone oil having approximately 0.01 wt % of OH and composed of 100 wt % of $(CH_3)_2SiO_{2/2}$ units and having a viscosity of 4,000, 000 mPa·s: 20 parts;

D: White spirit: 883 parts.

2) Crosslinkable Liquid Silicone Formulation According to the Invention (Composition C4):

It possesses the following constitution (the parts are given by weight):

A: mixture of:
hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)_3SiO_{1/2}$ units: 95 parts; and of
hydroxylated MQ resin having 2 wt % of OH and composed of 45 wt % of $SiO_{4/2}$ units and 55 wt % of $(CH_3)_3SiO_{1/2}$ units: 14 parts;

B: mixture of
  tris(3-(trimethoxysilyl)propyl)isocyanurate: 11 parts
  n-propyl (Pr) zirconate of formula Zr(OPr)$_4$: 41 parts
  n-butyl (Bu) titanate of formula Ti(OBu)$_4$: 4 parts; and of
  ethyl (Et) silicate of formula Si(OEt)$_4$: 8 parts;
C-1: mixture of:
  hydroxylated MDT resin having 0.5 wt % of OH and composed of 62 wt % of CH$_3$SiO$_{3/2}$ units, 24 wt % of (CH$_3$)$_2$SiO$_{2/2}$ units and 14 wt % of (CH$_3$)$_3$SiO$_{1/2}$ units: 20 parts; and of
  hydroxylated linear silicone oil having approximately 0.01 wt % of OH and composed 100 wt % of (CH$_3$)$_2$SiO$_{2/2}$ units and having a viscosity of 4,000,000 mPa·s: 80 parts;
D: White spirit: 727 parts.

3) Crosslinkable Liquid Silicone Formulation According to the Invention (Composition C5):
It possesses the following constitution (the parts are given by weight):
A: mixture of:
  hydroxylated MDT resin having 0.5 wt % of OH and composed of 62 wt % of CH$_3$SiO$_{3/2}$ units, 24 wt % of (CH$_3$)$_2$SiO$_{2/2}$ units and 14 wt % of (CH$_3$)$_3$SiO$_{1/2}$ units: 40 parts; and of
  hydroxylated MQ resin having 2 wt % of OH and composed of 45 wt % of SiO$_{4/2}$ units and 55 wt % of (CH$_3$)$_3$SiO$_{1/2}$ units: 6 parts;
B: mixture of
  3-aminopropyl trimethoxy silane: 8 parts
  n-propyl (Pr) zirconate of formula Zr(OPr)$_4$: 18 parts
  n-butyl (Bu) titanate of formula Ti(OBu)$_4$: 2 parts; and of
  ethyl (Et) silicate of formula Si(OEt)$_4$: 3 parts;
C-1: mixture of:
  hydroxylated MDT resin having 0.5 wt % of OH and composed of 62 wt % of CH$_3$SiO$_{3/2}$ units, 24 wt % of (CH$_3$)$_2$SiO$_{2/2}$ units and 14 wt % of (CH$_3$)$_3$SiO$_{1/2}$ units: 10 parts; and of
  hydroxylated linear silicone oil having approximately 0.01 wt % of OH and composed 100 wt % of (CH$_3$)$_2$SiO$_{2/2}$ units and having a viscosity of 4,000,000 mPa·s: 18 parts;
D: White spirit: 895 parts.

4) Crosslinkable Liquid Silicone Formulation According to the Invention (Composition C6):
It possesses the following constitution (the parts are given by weight):
A: hydroxylated MDT resin having 0.8 wt % of OH and composed of 23 wt % of CH$_3$SiO$_{3/2}$ units, 75 wt % of (CH$_3$)$_2$SiO$_{2/2}$ units and 2 wt % of (CH$_3$)$_3$SiO$_{1/2}$ units: 58 parts;
B: mixture of
  3-aminopropyl trimethoxy silane: 8 parts; and of
  n-propyl (Pr) zirconate of formula Zr(OPr)$_4$: 18 parts
C-1: mixture of:
  hydroxylated MDT resin having 0.8 wt % of OH and composed of 23 wt % of CH$_3$SiO$_{3/2}$ units, 75 wt % of (CH$_3$)$_2$SiO$_{2/2}$ units and 2 wt % of (CH$_3$)$_3$SiO$_{1/2}$ units: 20 parts; and of
  hydroxylated linear silicone oil having approximately 0.01 wt % of OH and composed 100 wt % of (CH$_3$)$_2$SiO$_{2/2}$ units and having a viscosity of 4,000,000 mPa·s: 25 parts;
D: White spirit: 871 parts.

5) Crosslinkable Liquid Silicone Formulation According to the Invention (Composition C7):
It possesses the following constitution (the parts are given by weight):
A: hydroxylated MDT resin having 0.5 wt % of OH and composed of 62 wt % of CH$_3$SiO$_{3/2}$ units, 24 wt % of (CH$_3$)$_2$SiO$_{2/2}$ units and 14 wt % of (CH$_3$)$_3$SiO$_{1/2}$ units: 100 parts;
B: mixture of
  tris(3-(trimethoxysilyl)propyl)isocyanurate: 13 parts; and of
  n-propyl (Pr) zirconate of formula Zr(OPr)$_4$: 41 parts
C-1: mixture of:
  hydroxylated MDT resin having 0.5 wt % of OH and composed of 62 wt % of CH$_3$SiO$_{3/2}$ units, 24 wt % of (CH$_3$)$_2$SiO$_{2/2}$ units and 14 wt % of (CH$_3$)$_3$SiO$_{1/2}$ units: 41 parts; and of
  hydroxylated linear silicone oil having approximately 0.01 wt % of OH and composed 100 wt % of (CH$_3$)$_2$SiO$_{2/2}$ units and having a viscosity of 4,000,000 mPa·s: 62 parts;
D: White spirit: 743 parts.

6) Comparison Formulation (Composition C8):
The results for compositions C3 to C7 are compared with those for a conventional composition C8 (known treatments sold under the trade names "Scotch Guard" or "Teflon") known for its excellent water-proofing properties. It is applied by means of a solvent according to the method recommended by the supplier.

7) Tests for Permanent Water-proofing:
The treated textile article used is a bi-stretch fabric based on Polyamide 6.6 (80 wt %) and elasthanne (20%). Said textile surface is cross-woven from elasthanne braided wire 44 dtex 1 strand and polyamide 6.6 44 dtex 34 strands. The resilience of the textile surface obtained is 100% in each direction and the surface weight is approximately 130 g/m$^2$.

The textile article is treated by padding with compositions C3 to C8. It undergoes a thermal treatment at 150° C. for 2 minutes, then is stored at ambient temperature for 8 hours before tests.

Measurement of the beading effect is performed by the water repellency test "Spray Test" (AATC Test Method 22-1996).
  To test the durability of the treatment, an industrial washing machine of the WASHCATOR (Electrolux) type was used for a continuous washing at 50° C. for variable periods of 8, 16 and 24 hours.
  Test results:
  The results show clearly that the textile article treated with compositions C3 to C7 according to the invention retains its water-proofing properties over time and during the washing at 50° C. in severe conditions of abrasion in humid medium, while the conventional treatment with composition C8 according to the prior art sees its performance plummet during the very first hours of washing.

| Mark awarded in the Spray Test after x hours of washing (%) | | | | | |
| --- | --- | --- | --- | --- | --- |
| Composition | Thermal treatment | 0 h | 8 h | 16 h | 24 h |
| C3 | 2 min 50° C. | 100 | 90 | 80 | 70 |
| C4 | 2 min 50° C. | 100 | 90 | 80 | 80 |
| C5 | 2 min 50° C. | 100 | 80 | 70 | 70 |
| C6 | 2 min 50° C. | 100 | 80 | 70 | 70 |

-continued

Mark awarded in the Spray Test after x hours of washing (%)

| Composition | Thermal treatment | Washing time: | | | |
|---|---|---|---|---|---|
| | | 0 h | 8 h | 16 h | 24 h |
| C7 | 2 min 50° C. | 100 | 80 | 70 | 70 |
| C8 | 2 min 50° C. | 100 | 50 | 0 | 0 |

Quantity of water retained on the textile specimen after x hours of washing (in g)

| Composition | Thermal treatment | Washing time: | | | |
|---|---|---|---|---|---|
| | | 0 h | 8 h | 16 h | 24 h |
| C3 | 2 min 50° C. | 0.31 | 0.33 | 0.59 | 0.93 |
| C4 | 2 min 50° C. | 0.46 | 0.48 | 0.58 | 0.81 |
| C5 | 2 min 50° C. | 0.24 | 0.39 | 0.65 | 0.90 |
| C6 | 2 min 50° C. | 0.42 | 0.45 | 0.68 | 0.81 |
| C7 | 2 min 50° C. | 0.32 | 0.62 | 0.77 | 1.04 |
| C8 | 2 min 50° C. | 0.30 | 1.18 | 1.33 | 1.62 |

EXAMPLE 4

1) Crosslinkable Liquid Silicone Formulation According to the Invention (Composition A):

It possesses the following constitution (the percentages are given in weight of the total composition):
A: mixture of:
  1.63% of hydroxylated MDT resin having 0.8 wt % of OH and composed of 23 wt % of $CH_3SiO_{3/2}$ units, 75 wt % of $(CH_3)_2SiO_{2/2}$ units and 2 wt % of $(CH_3)_3SiO_{1/2}$ units
  4.66% of hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)SiO_{1/2}$ units
  0.57% of hydroxylated MQ resin having 2 wt % of OH and composed of 45 wt % of $SiO_{4/2}$ units and 55 wt % of $(CH_3)_3SiO_{1/2}$ units
B: mixture of
  0.16% of n-butyl (Bu) titanate of formula $Ti(OBu)_4$
  1.6% of propyl zirconate of formula $Zr(OPr)4$
  0.33% of ethyl (Et) silicate of formula $Si(OEt)_4$
  0.8% of aminopropyl triethoxy silane
C: 2.48% of hydroxylated linear silicone gum having approximately 0.01 wt % of OH and composed 100 wt % of $(CH_3)_2SiO_{2/2}$ units and having a viscosity of 4,000,000 mPa·s
D: White spirit: balance to 100%.

2) Crosslinkable Liquid Silicone Formulation According to the Invention (Composition B):

It possesses the following constitution (the percentages are given in weight of the total composition):
A: mixture of:
  4.56% of hydroxylated MDT resin having 0.8 wt % of OH and composed of 23 wt % of $CH_3SiO_{3/2}$ units, 75 wt % of $(CH_3)_2SiO_{2/2}$ units and 2 wt % of $(CH_3)_3SiO_{1/2}$ units
  2.70% of hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)_3SiO_{1/2}$ units
  0.33% of hydroxylated MQ resin having 2 wt % of OH and composed of 45 wt % of $SiO_{4/2}$ units and 55 wt % of $(CH_3)_3SiO_{1/2}$ units
B: mixture of
  0.09% of n-butyl (Bu) titanate of formula $Ti(OBu)_4$
  1.8% of propyl zirconate of formula $Zr(OPr)_4$
  0.20% of ethyl (Et) silicate of formula $Si(OEt)_4$
  0.86% of aminopropyl triethoxy silane
C: 2.94% of hydroxylated linear silicone gum having approximately 0.01 wt % of OH and composed 100 wt % of $(CH_3)_2SiO_{2/2}$ units and having a viscosity of 4,000,000 mPa·s
D: White spirit: balance to 100%.

3) Crosslinkable Liquid Silicone Formulation According to the Invention (Composition C):

It possesses the following constitution (the percentages are given in weight of the total composition):
A: mixture of:
  4.0% of hydroxylated MDT resin having 0.8 wt % of OH and composed of 23 wt % of $CH_3SiO_{3/2}$ units, 75 wt % of $(CH_3)_2SiO_{2/2}$ units and 2 wt % of $(CH_3)_3SiO_{1/2}$ units
  2.24% of hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)SiO_{1/2}$ units
  0.28% of hydroxylated MQ resin having 2 wt % of OH and composed of 45 wt % of $SiO_{4/2}$ units and 55 wt % of $(CH_3)_3SiO_{1/2}$ units
B: mixture of
  0.08% of n-butyl (Bu) titanate of formula $Ti(OBu)_4$
  1.6% of propyl zirconate of formula $Zr(OPr)_4$
  0.16% of ethyl (Et) silicate of formula $Si(OEt)_4$
  0.8% of aminopropyl triethoxy silane
C: 3.35% of hydroxylated linear silicone gum having approximately 0.01 wt % of OH and composed of 100 wt % of $(CH_3)_2SiO_{2/2}$ units and having a viscosity of 4,000,000 mPa·s
D: White spirit: balance to 100%.

4) Comparative Formulation (Composition D):

The results for compositions A, B and C according to the invention are compared with those for a conventional composition D ("Scotch Guard") which is a commercial product known for its excellent water-proofing properties. A fluorinated acrylate in some butyl acetate is involved.

5) Comparative Specimen (Specimen E):

The results for compositions A, B and C according to the invention are also compared with those for a commercial textile known for its excellent properties of respirability and impermeability. Said textile is sold under the name EPIC by the company NEXTEC, and is composed of polyamide 6.6 and elasthanne, exhibiting a resilience of approximately 50% in the weft direction. Its specific weight is approximately 160 g/m². Said resilient fabric has undergone a treatment by a silicone treatment as described in the patent U.S. Pat. No. 5,876,792.

6) Treatment of a Textile by the Compositions A, B, C and D:

The textile is a woven textile of Polyamide 6.6 and elasthanne (80/20). It is composed of resilient cross-woven threads based on an elasthanne 44 dtex braided with a piece of PA 6.6 44 dtex/34 strands. Said textile surfaces have a sizeable bidirectional resilience (100% elongation in both directions) and a specific weight of 130 g/m².

The textile is treated by padding with the compositions. It undergoes a drying at ambient temperature for some minutes, then is heated for 2 min at 180° C.

7) Measurement of the Beading Effect:

Measurement of the beading effect is performed by the water repellency test "Spray Test" (AATC Test Method 22-1996) described above.

In order to obtain a more quantitative measurement of the durability aspect of the beading effect, the samples are washed according to the method described below, and are weighed before and after sprinkling, and the quantity of water retained by the textile is determined by the difference. Said quantity is then related to the quantity of water initially retained by the non-washed textile.

8) Measurement of the Impermeability to Liquid Water:

Measurement of the impermeability is performed by the impermeability test under the name of "Schmerber test" (ISO Test Method 811-1981):

The test consists in applying a water pressure to the textile by means of a water column and in measuring the minimum height that it is necessary to reach in order to ensure that the water passes through the textile.

In order to test the durability of the treatment, the textiles washed according to the method described below are also tested, and the results obtained are compared with those for the textile prior to washing.

9) Washing Method:

To test the durability of the treatment, an industrial washing machine (Wascator-Electrolux) is used. The cycle observed is as follows: washing in drinking water at 50° C. continuously for 8 h. Such a treatment is considered to be representative of the life of the textile in a real situation (in a washing cycle in a domestic machine the washing time is often only 15 min maximum and the level of friction induced is considerably lower than in industrial washing machines).

10) Test Results

The results show clearly that the textile treated by the compositions A, B and C according to the invention retain their properties of water repellency and impermeability over time, while the conventional treatments, referring to the market, which are based on fluorinated substances or silicone, see their performance deteriorate significantly during the washings.

There will be noted in particular the exceptional results for SCHMERBER in the case of the textiles treated according to the invention, which shows that the latter are capable of maintaining a very satisfying level of impermeability after numerous hours of use.

| Samples | SPRAY TEST Mark % Initial | SPRAY TEST Mark % After 8 h washing | SPRAY TEST Quantity of water retained by the textile, in g Initial | SPRAY TEST Quantity of water retained by the textile, in g After 8 h washing | SCHMERBER mm of water Initial | SCHMERBER mm of water After 8 h washing |
|---|---|---|---|---|---|---|
| A | 100 | 80 | 0.37 g | 0.45 | 265 | 261 |
| B | 100 | 80 | 0.36 g | 0.49 | 265 | 276 |
| C | 100 | 80 | 0.35 g | 0.50 | 278 | 266 |
| D | 100 | 50 | 0.1 | 0.97 | 230 | 122 |
| E | 100 | 50 | 0 | 1.27 | 300 | 68 |

EXAMPLE 5

Rapid drying —Results for Washing in Domestic Machine

1) Crosslinkable Liquid Silicone Formulation According to the Invention (Composition F):

It possesses the following constitution (the parts are given in weight):

A: mixture of:
 hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)_3SiO_{1/2}$ units: 47 parts; and of
 hydroxylated MQ resin having 2 wt % of OH and composed of 45 wt % of $SiO_{4/2}$ units and 55 wt % of $(CH_3)_3SiO_{1/2}$ units: 7 parts;

B: mixture of
 tris(3-(trimethoxysilyl)propyl)isocyanurate: 7 parts
 n-propyl (Pr) zirconate of formula $Zr(OPr)_4$: 20 parts
 n-butyl (Bu) titanate of formula $Ti(OBu)_4$: 2 parts; and of
 ethyl (Et) silicate of formula $Si(OEt)_4$: 4 parts;

C: mixture of:
 hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)_3SiO_{1/2}$ units: 10 parts; and of
 hydroxylated silicone gum (unit D) having approximately 0.01 wt % of OH and composed of 100 wt % of $(CH_3)_2SiO_{2/2}$ units: 20 parts.

D: White spirit: 883 parts.

2) Rapid Drying Tests:

The treated articles used are:

a bi-stretch fabric based on Polyamide 6.6 (80 wt %) and elasthanne (20%). Said textile surface is cross-woven from braided threaded elasthanne 44 dtex 1 strand and Polyamide 6.6 44 dtex 34 strands. The resilience of the textile surface obtained is 100% in each direction and the specific weight is approximately 130 g/m².

a tricot based on Polyamide 6.6 (100 wt %). It is obtained by interlock knitting performed on circular, double bed knitting machine with textured PA 6.6 threads 78 dtex 68 strands. Its resilience is approximately 100% in both directions and its specific weight approximately 130 g/m².

Said textile articles are treated by padding with the composition F. They undergo a thermal treatment at 150° C. for 3 minutes, after which they are stored at ambient temperature and humidity (23° C. and 50% RH) for 8 hours before tests.

In order to highlight the improvement in the drying rate, the treated textiles will be compared systematically with the corresponding untreated textiles. Circular specimens 8 cm in diameter are made. The humidification procedure comprises an initial weighing after 8 hours' equilibration in a conditioned room (23° C. and 50% RH), then a dynamic humidification phase carried out by means of a Shaker OSCILL 12 (Prolabo) laboratory beater. The specimens are arranged in a 250 ml bottle containing 125 ml of distilled water, which is fitted to the beater. The beater is then programmed for a beating period of 1 hour at the frequency of 5.5/10, thus allowing dynamic conditions (pressure variations, etc.) of the wetting of a textile to be simulated.

Measurement of the beading effect is performed by the water repellency test "Spray Test" (AATC Test Method 22-1996).

Measurement of the impermeability to liquid water is performed by the impermeability test "Schmerber test" (ISO Test Method 811-1981).

The humidity absorption or gain is measured by weighing of the specimen before and after dynamic humidification, and the values obtained are expressed in per cent by weight compared with the weight of the dry specimen.

Measurement and monitoring of the drying are performed on a specially equipped Mettler balance (automatic recording of the weight every minute) on which the circular 8 cm specimen is arranged (a single face of the sample being presented to the ambient air, thus simulating conditions of wearing the garment). Said balance is arranged in a conditioned room where a temperature of 23° C. and a relative humidity of 50% exist.

To test the durability of the treatment, a domestic washing machine of the NOVOTRONIC W 824 (Miele) type was used for a continuous washing at 50° C. for a period of 8 hours.

Test results:

The results show clearly that the textile articles treated with composition F according to the invention retain their qualities in terms of water repellency and Schmerber impermeability after 8 h of washing at 50° C. (which corresponds to conditions simulating highly intensive abrasive stressing in humid medium at the end of which most of the conventional treatments are completely nullified).

The textile articles treated with composition F exhibit in addition a much less marked increase in humidity absorption (in the conditions described above) than the control, both before and after residence in the machine for 8 h at 50° C. A low level of increase in humidity is essential for improved comfort, since, in far gentler conditions of humidification, obviously, than those practised here, the "freezing effect", well known to practitioners of mountain sports, will be the more intense the greater the quantity of water that is absorbed by the fabric.

Furthermore, it is possible to observe that the 2 textile surfaces (fabric and tricot) exhibit much faster drying rates after treatment with composition F according to the invention. Said drying rate remains higher in the case of the samples that have undergone washing for 8 hours at 50° C.

| Textile surface | Treatment | Washing | Spray test % | Schmerber (mm) | Water absorption % | Drying time (min) |
|---|---|---|---|---|---|---|
| Stitch | — | — | 0 | 0 | 200 | 139 |
| Stitch | F | — | 100 | 135 | 97 | 83 |
| Stitch | F | 8 h - 50° C. | 90 | 105 | 127 | 108 |
| Woven | — | — | 0 | 0 | 199 | 101 |
| Woven | F | — | 100 | 265 | 114 | 92 |
| Woven | F | 8 h - 50° C. | 90 | 255 | 135 | 94 |

EXAMPLE 6

Washing with Detergent and Dry Cleaning—Durability

1) Crosslinkable Liquid Silicone Formulation According to the Invention:

It possesses the following constitution (the parts are given by weight):

A: mixture of:
hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)_3SiO_{1/2}$ units: 47 parties; and of
hydroxylated MQ resin having 2 wt % of OH and composed of 45 wt % of $SiO_{4/2}$ units and 55 wt % of $(CH_3)_3SiO_{1/2}$ units: 7 parts;

B: mixture of
tris(3-(trimethoxysilyl)propyl)isocyanurate: 7 parts
n-propyl (Pr) zirconate of formula $Zr(OPr)_4$: 20 parts
n-butyl (Bu) titanate of formula $Ti(OBu)_4$: 2 parts; and of
ethyl (Et) silicate of formula $Si(OEt)_4$: 4 parts;

C: mixture of:
hydroxylated MDT resin having 0.5 wt % of OH and composed of 62 wt % of $CH_3SiO_{3/2}$ units, 24 wt % of $(CH_3)_2SiO_{2/2}$ units and 14 wt % of $(CH_3)_3SiO_{1/2}$ units: 10 parts; and of
hydroxylated silicone gum (unit D) having approximately 0.01 wt % of OH and composed of 100 wt % of $(CH_3)_2SiO_{2/2}$ units: 20 parts.

2) Detergent Washing Tests in Domestic Machine:

The spray test results (standard AATC 22-1996) were checked against repeated machine washing cycles.

The domestic washing machine used was a CANDY AQUAMATIC 3 machine (40° C. with centrifuging cycle). The detergent dose used was 4 g/liter corresponding to about 35 g per cycle. The drying conditions that were observed were 3 h at 23° C.-50% RH.

3) Dry Cleaning Tests:

The results of the Spray Test (standard AATC 22-1996) were checked against repeated dry cleaning cycles. The same characteristics were determined. The tests were conducted in an industrial dry cleaner's by means of a BÖWE P 250 machine functioning with perchloroethylene.

The textile surface subjected to this test was a 120 g/m² bistretch fabric having about 60% elongation in both directions.

4) Test Results:

The two tables of results below show clearly that the treatment applied retains good water repellency results after a series of domestic washings with detergent or a dry cleaning series.

| | Number of washing cycles: | | | | | | | | | | |
|---|---|---|---|---|---|---|---|---|---|---|---|
| | 0 | 1 | 2 | 3 | 4 | 5 | 6 | 7 | 8 | 9 | 10 |
| Mark in Spray Test (%) | 100 | 100 | 100 | 100 | 90 | 90 | 90 | 70 | 70 | 70 | 70 |

|  | Number of dry cleaning cycles: | | | |
| --- | --- | --- | --- | --- |
|  | 0 | 1 | 2 | 3 |
| Mark in Spray Test (%) | 100 | 100 | 90 | 90 |

It must be emphasised that the invention defined by the attached claims is not limited to the particular embodiments given in the description above, but includes variants of them that are neither beyond the scope nor the spirit of the present invention.

The invention claimed is:

1. A method of conferring on a textile material and/or threads, fibers and/or filaments constituting said textile material properties of water repellency and impermeability which are durable without substantially reducing the intrinsic respirability of said textile material, said method comprising coating said textile material and/or said threads, fibers or filaments with a crosslinkable liquid silicone formulation comprising:

A—a system for generating a film-forming silicone network containing at least one polyorganosiloxane (POS) resin which crosslinks through polycondensation and which exhibits, per molecule, at least two different siloxyl units selected from those of types M, D, T, Q, one of the units being a T unit, and at least three hydrolyzable/condensable groups of types OH and/or $OR^1$ where $R^1$ is a $C_1$ to $C_6$ linear or branched alkyl radical, wherein each unit M has the formula $(R^3)_3SiO_{0.5}$, each unit D has the formula $(R^3)_2SiO$, each unit T has the formula $R^3SiO_{1.5}$ and each unit Q has the formula $SiO_2$ and wherein the $R^3$ radicals are identical or different and are selected from $C_1$-$C_6$ linear or branched alkyl radicals, $C_2$-$C_4$ alkenyl, phenyl and 3,3,3-trifluoropropyl radicals;

B—a system promoting anchorage of said network to the surface of the textile material, consisting of:
(i) B-1 at least one metallic alkoxide with the general formula:

in which:
M is a metal selected from the group consisting of Ti, Zr, Ge, Si, Mn and Al;
n=valency of M;
the substituents $R^2$, identical or different, each represent a $C_1$ to $C_{12}$ alkyl radical, linear or branched;
a represents 0, 1 or 2;
with the conditions according to which, when the symbol a=0, the alkyl radical $R^2$ has from 2 to 12 carbon atoms, and when the symbol a is 1 or 2, the alkyl radical $R^2$ has from 1 to 4 carbon atoms;
optionally, the metal M is linked to a ligand; or
(ii) B-2 at least one metallic polyalkoxide resulting from the partial hydrolysis of the monomeric alkoxides of formula (I) above, in which the symbol $R^2$ has the aforementioned meaning with the symbol a=0;
(iii) a combination of B-1 and B-2; or
(iv) B-3 a combination of B-1 and/or B-2 with:
(a) B-3/1 at least one optionally alkoxylated organosilane having, per molecule, at least one $C_2$-$C_6$ alkenyl group, (b) and/or B-3/2 at least one organosilicic compound having at least one epoxy, amino, ureido, isocyanato and/or isocyanurate radical; and C—a functional additive consisting of:
(i) either C-1 at least one silane and/or at least one essentially linear POS and/or at least one POS resin, each of said organosilicic compounds being equipped, per molecule, on the one hand with anchorage functions (AF) capable of reacting with A and/or B or capable of generating in situ functions capable of reacting with A and/or B and on the other with hydrophobicity function(s) (HF) which can be identical to or different from the AFs;
(ii) or C-2 at least one hydrocarbon compound containing at least one linear or branched, saturated or unsaturated hydrocarbon group and optionally one or more heteroatom(s) other than Si and present in the form of a monomeric, oligomeric or polymeric structure, said hydrocarbon compound being equipped, per molecule, on the one hand with anchorage function(s) (AF) capable of reacting with A and/or B or capable of generating in situ functions capable of reacting with A and/or B and on the other with hydrophobicity function(s) (HF) which can be identical to or different from the AFs;
(iii) or a mixture of C-1 and C-2; and D—optionally a non-reactive additive system consisting of: (i) at least one organic solvent and/or one non-reactive organosilicic compound; (ii) and/or water;

with the condition according to which there are employed (in parts given by weight):
per 100 parts of constituent A,
from 0.5 to 200 parts of constituent B,
1 to 1,000 parts of constituent C and
from 0 to 10,000 parts of constituent D, wherein (i) the coating step is conducted in such a manner that the silicone formulation crosslinks around the threads, fibers and/or filaments constituting the textile material and forms around them a crosslinked silicone sheath, and (ii) this confers on said textile material water repellency and impermeability which are durable, without substantially reducing the intrinsic respirability of the textile material wherein constituent A is a mixture A-3: (i) of at least one resin having, in its structure, at least two different siloxyl units selected from those of formula $(R^3)_3SiO_{0.5}$ (unit M), $(R^3)_2SiO$ (unit D) and $R^3SiO_{1.5}$ (unit T), at least one of said units being a T unit, the OH and/or $OR^1$ groups being optionally borne by the M, D and/or T units and the content by weight of OH and/or $OR^1$ groups lying between 0.2 and 10 wt %, and (ii) of at least one other resin having, in its structure, at least two different siloxyl units selected from those of formula $(R^3)_3SiO_{0.5}$ (unit M), $(R^3)_2SiO$ (unit D) and $R^3SiO_{1.5}$ (unit T) and $SiO_2$ (unit Q), at least one of said units being a Q unit, the OH and/or $OR^1$ groups being optionally borne by the M, D and/or T units and the content by weight of OH and/or $OR^1$ groups lying between 0.2 and 10 wt %.

2. The method according to claim 1, which confers on the textile material a beading effect of between 80 and 100% according to the method Spray Test AATC Test Method 22-1996.

3. The method according to claim 1, which confers on the textile material a beading effect of between 80 and 100% according to the method Spray Test AATC Test Method 22-1996, said beading effect being maintained at a value of between 70 and 100% after 8 hours of continuous washing by machine with water at 50° C.

4. The method according to claim 1, which confers on the textile material an impermeability to liquid water corresponding to a water column greater than or equal to 10 cm, as measured by the Schmerber test ISO Test Method 811-1981.

5. The method according to claim 4, wherein the water column is greater than or equal to 15 cm.

6. The method according to claim 5, wherein the water column is greater than or equal to 20 cm.

7. The method according to claim 1, which confers on the textile material an impermeability to liquid water corresponding to a water column greater than or equal to 10 cm, as measured by the Schmerber test ISO Test Method 811-1981, said impermeability remaining greater than or equal to 10 cm, after 8 hours of continuous washing by machine with water at 50° C.

8. The method according to claim 7, wherein the water column is greater than or equal to 15 cm.

9. The method according to claim 8, wherein the water column is greater than or equal to 20 cm.

10. The method according to claim 1, which confers on the textile material in addition properties of reduced water absorption.

11. The method according to claim 1, which confers on the textile material in addition properties of rapid drying.

12. The method according to claim 1, wherein the coated textile material is suitable for the production of sportswear.

13. The method according to claim 1, wherein the radical $R^1$ of constituent A is a $C_1$ to $C_3$ linear or branched alkyl radical.

14. The method according to claim 1, wherein a constituent B-1 is employed containing an alkyl titanate, an alkyl zirconate, an alkyl silicate or a mixture of at least two of them, and/or a constituent B-2 is employed containing a polytitanate produced by the partial hydrolysis of isopropyl titanate, butyl titanate or ethyl-2-hexyl titanate, a polyzirconate produced by the partial hydrolysis of propyl and butyl zirconate, a polysilicate produced by the partial hydrolysis of ethyl and isopropyl silicate or a mixture of at least two of them.

15. The method according to claim 14, wherein the constituent B-1 contains a compound selected from the group consisting of ethyl titanate, propyl titanate, isopropyl titanate, butyl titanate, ethyl-2-hexyl titanate, octyl titanate, decyl titanate, dodecyl titanate, β-methoxyethyl titanate, β-ethoxyethyl titanate, β-propoxyethyl titanate, titanate of formula $Ti[(OCH_2CH_2)_2OCH_3]_4$, propyl zirconate, butyl zirconate, methyl silicate, ethyl silicate, isopropyl silicate, and n-propyl silicate and a mixture of at least two of them.

16. The method according to claim 1, wherein a constituent C-1 is employed containing:

(i) an essentially linear diorganopolysiloxane having a hydroxyl group at each chain end, with the formula:

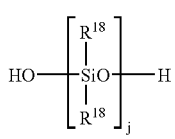

(III)

in which:

(a) the substituents $R^{18}$, identical or different, each represent a $C_1$ to $C_{13}$ saturated or unsaturated monovalent hydrocarbon radical, substituted or non-substituted, aliphatic, cyclic or aromatic;

(b) j has a value sufficient to confer on the diorganopolysiloxane of formula (III) a dynamic viscosity at 25° C. ranging from 50 to 10,000,000 mPa·s;

(ii) a hydroxylated POS resin having in its structure siloxyl units T and optionally M and/or optionally D;

(iii) a hydroxylated POS resin which is obtained:

(a) by hydrolysis of an alkoxysilane S substituted by HFs;

(b) by homocondensation of the hydrolysed silanes S;

(c) and by stripping of the hydrolysates derived from the HFs; or (iv) a mixture of at least two of the compounds (i), (ii) and (iii).

17. The method according to claim 16, wherein a hydroxylated MDT resin having a content by weight of group OH of between 0.2 and 10 wt % is employed.

18. The method according to claim 1, wherein a fluorinated alcohol is employed as constituent C-2.

19. The method according to claim 18, wherein said fluorinated alcohol is a perfluorinated alcohol of the formula:

$$R^{19}\text{—OH} \quad \quad (IV)$$

where $R^{19}$ represents an aliphatic, linear or branched radical having from 2 to 20 carbon atoms, said carbon atoms being substituted by at least one fluorine atom and optionally by at least one hydrogen atom.

20. The method according to claim 19, wherein said perfluorinated alcohol has the formula $R^F$—$(CH_2)_m$—OH, wherein $R^F$ represents the group —$C_sF_{2s}$—$CF_3$ with s being equal to or different from zero or the group $C_sF_{2s}H$ with s being equal to or more than 1, and m is a number from 0 to 10.

21. The method according to claim 1, wherein said liquid silicone formulation further comprises a polycondensation catalyst.

22. The method according to claim 1, wherein said liquid silicone formulation further comprises a filler.

23. The method according to claim 1, wherein the liquid silicone formulation is first prepared in concentrated form, and is then diluted with an organic diluent, an organic solvent or water at the rate of 1 to 30 parts by weight of formulation per 100 parts by weight of solvent, diluent or water at the time of carrying out the coating step.

24. The method according to claim 1, wherein the composition is directly applied to textile articles having at least one textile surface.

25. The method according to claim 1, wherein the composition is applied to the threads, fibers and/or filaments during a process for the production of the textile material.

* * * * *